United States Patent [19]

Witschi

[11] Patent Number: 5,600,996
[45] Date of Patent: Feb. 11, 1997

[54] METHOD AND APPARATUS FOR TESTING THE TIGHTNESS OF HOUSINGS

[75] Inventor: Friedrich Witschi, Büren an der Aare, Switzerland

[73] Assignee: Witschi Electronic AG, Buren an der Aare, Switzerland

[21] Appl. No.: 419,679

[22] Filed: Apr. 12, 1995

[30] Foreign Application Priority Data

Apr. 13, 1994 [CH] Switzerland ............................ 1096/94

[51] Int. Cl.$^6$ .......................... G01M 3/02; G01M 3/36
[52] U.S. Cl. ................................ 73/49.2; 73/40; 73/52
[58] Field of Search .......................... 73/49.2, 49.3, 73/40, 52

[56] References Cited

U.S. PATENT DOCUMENTS

| | | | |
|---|---|---|---|
| 3,791,197 | 2/1974 | Fukuda | 73/49.3 |
| 3,792,607 | 2/1974 | Fukuda | 73/49.3 |
| 3,793,877 | 2/1974 | Fukuda | 73/49.3 |
| 3,839,900 | 10/1974 | Fukuda | 73/49.3 |
| 4,126,034 | 11/1978 | Conrad | 73/49.2 |
| 4,542,643 | 9/1985 | Himmelstein | 73/49.2 |
| 4,571,986 | 2/1986 | Fujii et al. | 73/49.1 |
| 4,670,847 | 6/1987 | Furuse | 364/507 |
| 4,675,834 | 6/1987 | Furuse | 364/558 |
| 4,686,851 | 8/1987 | Holm et al. | 73/49.2 |
| 4,811,252 | 3/1989 | Furuse | 364/556 |
| 4,838,073 | 6/1989 | Jansch | 73/40.7 |
| 4,899,573 | 2/1990 | Dimmick et al. | 73/49.2 |
| 4,951,496 | 8/1990 | Aarts | 73/49.3 |
| 5,029,464 | 7/1991 | Lehmann | 73/49.3 |
| 5,123,278 | 6/1992 | McKittrick | 73/52 |
| 5,317,902 | 6/1994 | Steiger et al. | 73/49.2 |
| 5,367,797 | 11/1994 | Zaim | 73/49.2 |
| 5,471,867 | 12/1995 | Tuma et al. | 73/49.2 |
| 5,495,748 | 5/1996 | Brede et al. | 73/40 |

FOREIGN PATENT DOCUMENTS 2148466  3/1973  France .

Primary Examiner—Hezron E. Williams
Assistant Examiner—J. David Wiggins
Attorney, Agent, or Firm—Rothwell, Figg, Ernst & Kurz, P.C.

[57] ABSTRACT

To measure the leakage rate in hollow bodies, the through-flow rate of the air flowing into the leaky hollow body is automatically measured and indicated numerically at a given test pressure. This is achieved by feeding fluid from a prechamber filled with fluid under measuring pressure to two measuring chambers (4,5) equipped with a testpiece and reference housing and having an identical cavity. The pressure decrease in a prechamber (1) is thereupon evaluated as a measure of the accessible volume in the two measuring chambers (4,5) and is compared with the volume given as permissible. If the measured accessible volume is higher than the volume given by the size of the chamber, the testpiece is qualified as highly leaky. If the volumes in the two chambers (4,5) correspond to one another, the chambers (4,5) are separated from the prechamber and the pressure difference between the chambers (4,5) and its trend in time are detected, in order to determine from this a measure of the tightness of the testpiece. The tightness of hollow bodies can thereby be detected quickly and accurately.

10 Claims, 1 Drawing Sheet

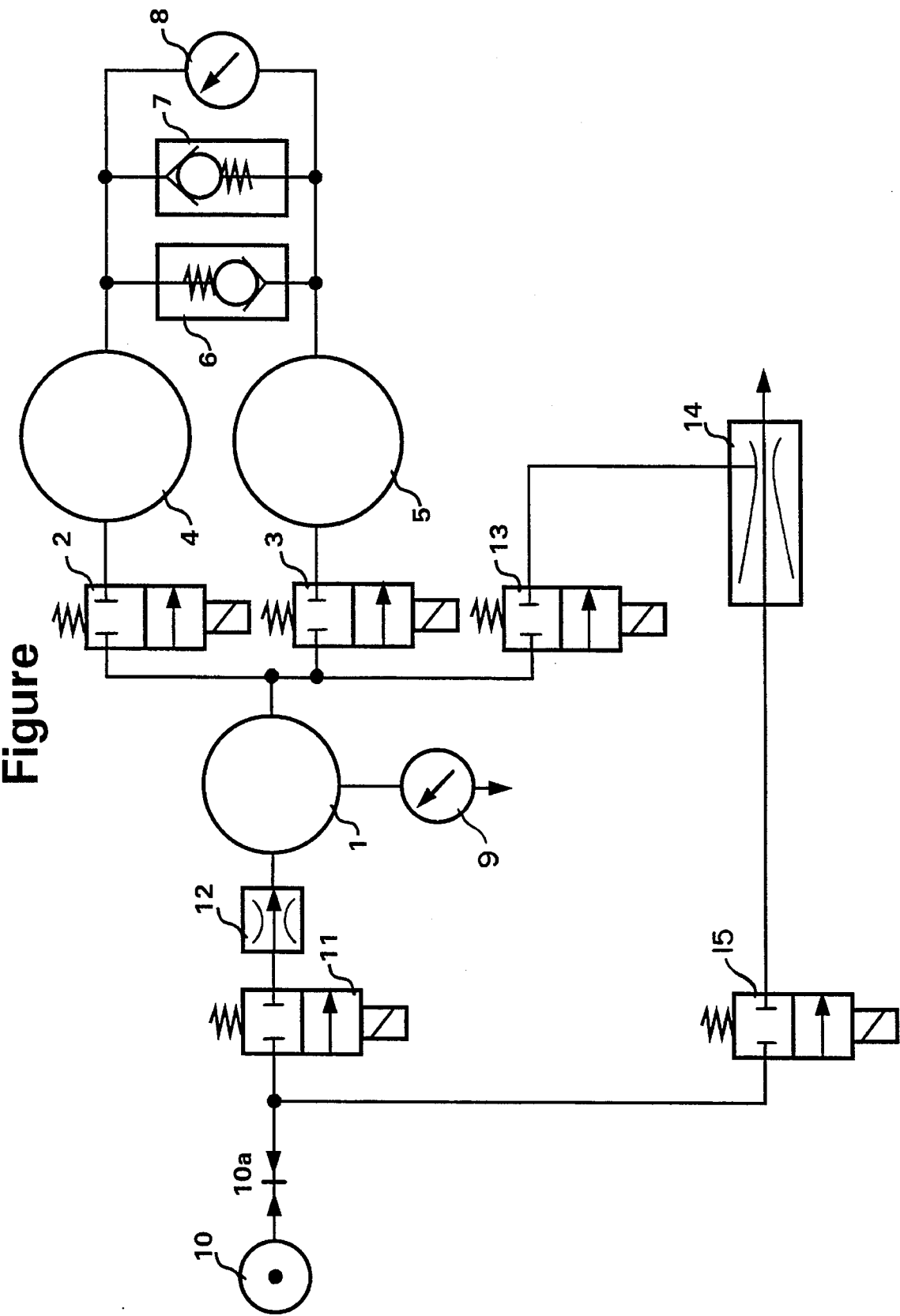
Figure

METHOD AND APPARATUS FOR TESTING THE TIGHTNESS OF HOUSINGS

The present invention relates to a method for testing the tightness of housings by exposing the housing to be tested and a reference housing, in each case in identical measuring chambers, to a fluid with overpressure or with underpressure, by detecting the difference in the quantity of fluid admitted in the two chambers and by determining from this a measure of the tightness of the housing to be tested.

Test appliances which work on the deformation principle, the deformation being measured and the regression of the measured deformation of the housing being analyzed, are suitable for servicing work, because the test appliances necessary for this could be used, without adaptations, for all types of housings. These appliances usually work with air. When employed in production, such appliances have the following disadvantages:

The measuring times are long, primarily where hard housings are concerned. In the case of soft housings and plastic housings, long stabilizing times have to be complied with. Since the housings are by their very nature filled with air, this must be taken into account, above all in measurements in the underpressure range.

It has been shown that appliances based on a measurement of the pressure variation in a measuring chamber require long stabilizing and measuring times on account of the extremely low leakage rates and on account of the thermal effects during the filling of the measuring chamber. Above all, numerical leakage rates cannot be calculated, because the necessary parameters are absent or are obtainable only incompletely.

FR-A-2,148,466 describes an apparatus for determining a leak in a fluid-tight object. It is proposed to introduce a testpiece and a reference housing into two respective chambers separated from one another and having identical volumes. Compressed air is fed to the two chambers from a compressed-air source. If the testpiece has only a very low leakage, the possible small pressure difference between the two chambers can be measured by means of a pressure gage.

If the testpiece has a high leakage, pressure equalization already occurs during the filling of the chamber, so that the pressure difference between the times of before and after fluid-filling is zero. Now if the two chambers are each connected to a further smaller chamber, the pressure in the first chamber having the reference housing decreases more sharply than that in the chamber having the testpiece. This pressure drop indicates how high the leakage of the testpiece is.

Accordingly, an object of the invention is to provide a method and an apparatus in order, during the measurement of the leakage rate in hollow bodies, to make it possible to have a numerical indication automatically, at a given test pressure, by a determination of the throughflow rate of the air flowing into the leaky hollow body.

According to the invention, this is achieved, according to the characterizing part of the claim for a method, in that fluid from a prechamber filled with fluid under measuring pressure is fed to the two measuring chambers equipped with the testpiece and reference housing and each chamber having an identical cavity, in that the pressure decrease in the prechamber is evaluated as a measure of the fluid accessible volume in the two measuring chambers and is compared with the predetermined volume given for the two chambers as permissible, in that, when this fluid-accessible volume corresponds at least approximately to the given volume, the pressure difference in the two chambers is detected, in order to determine from this a measure of the tightness of the testpiece, and in that, when the fluid-filling capacity or apparent volume is larger than the given volume, the testpiece is discarded as leaky.

The apparatus for carrying out the method is characterized, according to claim 5, by a prechamber for building up the test pressure in the fluid provided, by two parallel branches connected thereto and each having a stop valve for feeding the test chamber and the reference chamber, furthermore by two counterconnected pressure-relief valves between the test chamber and the reference chamber, and by a differential-pressure sensor connected parallel to the pressure-relief valves.

The invention is explained in more detail below by means of the drawing, the single FIGURE showing diagrammatically an arrangement of an appliance for carrying out the method.

Compressed air is fed from a compressor 10, via an isolating valve 10a, an inlet valve 11 and a throttle 12, to a prechamber 1, to which a pressure sensor 9 for determining the pressure is connected. This prechamber 1 is connected to a test chamber 4 and a reference chamber 5, in each case via a stop valve 2,3. Moreover, in order to protect the sensitive differential-pressure sensor 8 located downstream, these two chambers 4,5 are connected to the latter via two counterconnected pressure-relief valves 6,7.

Moreover, the prechamber 1 is connected via an outlet valve 13 to a vacuum generator 14, such as a Venturi tube, by means of which a connection between the isolating valve 10a and the inlet valve 11 becomes possible via a vacuum valve 15. However, the chambers 4, 5 can also be emptied via the outlet valve. The underpressure generated by means of the Venturi tube can be fed into the prechamber 1 via a valve 15, with the result that the test can also be carried out in respect of underpressure.

The two chambers 4 and 5 are identical in terms of their volume and have only very small overdimensions in relation to the measurement, e.g., housings or appliances objects. Furthermore, they are closed by means of a common cover (not shown). One chamber 4 can be the so-called test chamber and the other chamber 5 can be the reference chamber. Consequently, for the measurements of tightness, a reference hollow body is introduced into the reference chamber 5 and a testpiece of the same type as the reference hollow body is introduced into the test chamber.

For the measurement, compressed air from the prechamber 1 is fed simultaneously to the two chambers 4,5 via the two now opened stop valves 2,3. As a result of the connection of the two chambers 4,5 to the prechamber 1 via the stop valves 2,3 and by means of the common cover, the pressure conditions and temperature conditions in the two chambers 4,5 are the same, so that any disturbing effects are compensated automatically by means of the symmetrical design of the measuring apparatus. After filling of the chambers 4,5, the two stop valves 2,3 are closed and the two chambers 4,5 thereby separated from one another.

The leakage rate can then be calculated from the variation in the pressure difference between the two chambers 4,5 because the free volumes surrounding the two objects in the two chambers 4,5 and the volume of the prechamber 1 are known.

For determining the free volume, first the prechamber 1, the volume of which is known, is filled up to a specific pressure as a result of the brief opening of the inlet valve 11, with the stop valves 2, 3 closed. Subsequently, with the inlet-valve 11 closed, the two stop valves 2,3 are opened. The free volume in the chambers 4,5 can be determined from the pressure drop detectable by the pressure sensor 9.

If the testpiece has a large leak, it is already filled completely with air during the filling of the chambers 4,5. It can be detected by means of the sensor that the pressure drop in the prechamber 1 is higher than in the case of tight housings. This information makes it possible to draw the conclusion that the housing to be measured is leaky. If the detected value corresponds to the desired value, a pressure difference can be detected if the testpiece absorbs air slowly as a result of a slight leak. The leak can be determined arithmetically by an analysis of the pressure difference between the two chambers and its variation.

Because the chambers and the measuring appliances are all of symmetrical design, the disturbing effects, such as thermal effects, deformations of the measurement object or of the seals, are largely self-compensated and the pressure differences can be detected with high sensitivity without long stabilizing times due to the small degree of overdimensions for the chamber size as compared to the housing size.

As a result of this absolute symmetry of the arrangement, leaks of the reference housing or other body can also be detected. It is therefore possible, with restrictions, to introduce a second testpiece into the reference chamber instead of the reference housing or other body. The capacity of the arrangement can consequently be doubled. However, if both bodies had an exactly identical leakage rate, both would be qualified as tight, even if, as a result of a different and more exact measurement, they both had too high identical leakage values. On the assumption that such a case could occur, although it is highly unlikely, this disadvantage can be accepted for the benefit of higher productivity while using the claimed invention during leak testing and housing integrity qualification.

What is claimed is:

1. A method for testing the fluid-tightness of hollow bodies by exposing a hollow body to be tested as a testpiece and a reference hollow body to a test fluid, said method comprising:

disposing said testpiece in a first measuring chamber and said reference hollow body in a second measuring chamber, said first and second measuring chambers having identical volumes;

in a prechamber, creating an overpressure or an underpressure of test fluid relative to fluid pressures within said first and second measuring chambers;

subsequently establishing fluid communication between said prechamber and said first and second measuring chambers;

measuring a change in the overpressure or the underpressure of the test fluid in said prechamber as an indicator of a free volume of fluid admitted to or expelled from said first and second measuring chambers;

if said free volume of fluid admitted to or expelled from said first and second measuring chambers exceeds a predetermined value, determining that said testpiece is leaky and discarding said testpiece; and if said free volume of fluid admitted to or expelled from said first and second measuring chambers substantially equals said predetermined value, a) terminating said fluid communication between said prechamber and said first and second measuring chambers, b) measuring, by means of a gauge disposed in fluid communication between said first and second measuring chambers, a pressure differential between said first and second measuring chambers and variation thereof with time, and c) determining the fluid-tightness of said testpiece based on said pressure differential and said variation thereof with time.

2. The method of claim 1 wherein said creating an overpressure or an underpressure comprises establishing a predetermined fluid pressure within said prechamber, and said fluid communication is established between said prechamber and said first and second measuring chambers simultaneously so as to determine said free volume from said change in the overpressure or the underpressure of the test fluid in said prechamber.

3. The method of claim 1 wherein said test fluid is air.

4. The method of claim 3 wherein said creating an overpressure or an underpressure of test fluid comprises filling said prechamber by means of an air compressor or evacuating said prechamber by means of a Venturi tube, respectively.

5. An apparatus for testing the fluid-tightness of hollow bodies by exposing a hollow body to be tested as a testpiece and a reference hollow body to a test fluid, said apparatus comprising:

a prechamber;

first and second measuring chambers connected in parallel to said prechamber for fluid communication with said prechamber;

first and second stop valves disposed between said prechamber and each of said first and second measuring chambers, respectively, for selectively allowing and terminating said fluid communication;

a pair of pressure relief valves counter-connected in parallel in fluid communication between said first and second measuring chambers; and a differential pressure gauge connected in fluid communication between said first and second measuring chambers and in parallel with said pressure relief valves.

6. The apparatus of claim 5 wherein said test fluid is air, said apparatus further comprising:

an air compressor which provides compressed air to said prechamber, and an air inlet valve and a throttle disposed between said air compressor and said prechamber;

a compressed air valve connected by means of a branch line between said air compressor and said air inlet valve and said throttle;

an outlet valve in fluid communication with said prechamber and connected in parallel with said first and second stop valves; and a vacuum generator connected in fluid communication with an outlet of said outlet valve and in fluid communication, via said compressed air valve, with said air compressor.

7. The apparatus of claim 5, further comprising a pressure sensor for determining fluid pressure within said prechamber.

8. The apparatus of claim 7, further comprising an electronic control system which monitors a measurement cycle, evaluates signals generated by said pressure sensor, controls activation of said first and second stop valves, evaluates signals generated by said differential pressure gauge to determine whether said testpiece is fluid-tight or leaky, and indicates a result of said determining whether said testpiece is fluid-tight or leaky.

9. The method of claim 2 wherein the test fluid is air.

10. The apparatus of claim 6, further comprising a pressure sensor for determining fluid pressure within said prechamber.

* * * * *